(12) United States Patent
Huang et al.

(10) Patent No.: US 8,379,396 B2
(45) Date of Patent: Feb. 19, 2013

(54) ELECTRONIC DEVICE AND CONNECTING MECHANISM THEREOF

(75) Inventors: Chien-Wei Huang, Taoyuan County (TW); Ying-Xing Lee, Taoyuan County (TW); I-Cheng Chuang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 330 days.

(21) Appl. No.: 12/774,435

(22) Filed: May 5, 2010

(65) Prior Publication Data

US 2011/0051379 A1 Mar. 3, 2011

(30) Foreign Application Priority Data

Sep. 2, 2009 (TW) ................................ 98129509 A

(51) Int. Cl.
*H05K 7/00* (2006.01)

(52) U.S. Cl. .................... 361/749; 361/679.39; 361/727

(58) Field of Classification Search .................. 361/727, 361/818, 749
See application file for complete search history.

(56) References Cited

U.S. PATENT DOCUMENTS

| | | | |
|---|---|---|---|
| 2007/0115255 A1 | 5/2007 | Pan | |
| 2008/0298025 A1 | 12/2008 | Chang et al. | |
| 2009/0015993 A1* | 1/2009 | Tsai et al. | 361/679 |
| 2010/0027206 A1* | 2/2010 | Shen | 361/679.21 |
| 2010/0130272 A1* | 5/2010 | Im et al. | 455/575.4 |
| 2010/0331060 A1* | 12/2010 | Yoshida | 455/575.1 |

FOREIGN PATENT DOCUMENTS

| | | |
|---|---|---|
| CN | 1949793 A | 4/2007 |
| EP | 1 775 596 A2 | 4/2007 |
| EP | 2 019 537 A2 | 1/2009 |

\* cited by examiner

*Primary Examiner* — Tuan T Dinh
*Assistant Examiner* — Mukund G Patel
(74) *Attorney, Agent, or Firm* — Birch, Stewart, Kolasch & Birch, LLP

(57) ABSTRACT

A connecting mechanism is provided to connect an input module to a display module of an electronic device, wherein the display module is slidable relative to the input module along a first direction. The connecting mechanism includes a FPC and a sliding hinge comprising a fixed member fixed to the input module, a slider fixed to the display module, and a sliding plate fixed to the slider and movably received in a concave space of the fixed member. The FPC has a first portion extended from a side wall of the fixed member to the middle of the slider along a second direction, and the first portion is bent and extended along the first direction to an opening of the slider. A bent portion of the FPC passes through the opening to connect the first portion and a second portion of the FPC, wherein the first and second portions are on opposite sides of the slider.

18 Claims, 6 Drawing Sheets

ELECTRONIC DEVICE AND CONNECTING MECHANISM THEREOF

CROSS REFERENCE TO RELATED APPLICATIONS

This Application claims priority of Taiwan Patent Application No. 098129509, filed on Sep. 2, 2009, the entirety of which is incorporated by reference herein.

BACKGROUND OF THE INVENTION

1. Field of the Invention

This application relates in general to a connecting mechanism and in particular to a connecting mechanism for a sliding-type electronic device.

2. Description of the Related Art

Referring to FIG. 1, a conventional sliding-type mobile phone or PDA includes a display module 100 and an input module 200 reciprocally movable with respect to each other (as the arrows indicate in FIG. 1), wherein the display module 100 includes a screen 300, and the input module 200 includes a keypad 400.

As shown in FIG. 2A, a flexible circuit board F (FPC) is usually provided to electrically connect a circuit board 101 in the display module 100 with another circuit board 201 in the input module 200. Conventionally, the FPC F is extended from the circuit board 101 through an opening 102 of the display module 100 and another opening 202 of the input module 200 to the circuit board 201.

Referring to FIG. 2B, when the display module 100 slides rightward with respect to the input module 200 to an opened state, the openings 102 and 202 overlap with the FPC F passing therethrough. Since the FPC F is extended along an S-shaped path to connect the display module 100 and the input module 200, as shown in FIGS. 2A and 2B, interference and friction between the FPC F and the casing 103 of the display module 100 (or the keypad 400) are inevitable during sliding, thus contributing to subsequent damage and failure of the FPC F.

BRIEF SUMMARY OF INVENTION

The application provides a connecting mechanism to connect an input module to a display module of an electronic device, wherein the display module is slidable relative to the input module along a first direction. The connecting mechanism includes a FPC and a sliding hinge comprising a fixed member fixed to the input module, a slider fixed to the display module, and a sliding plate fixed to the slider and movably received in a concave space of the fixed member. The FPC has a first portion extended from a side wall of the fixed member to the middle of the slider along a second direction, and the first portion is bent and extended along the first direction to an opening of the slider. A bent portion of the FPC passes through the opening to connect the first portion and a second portion of the FPC, wherein the first and second portions are on opposite sides of the slider.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
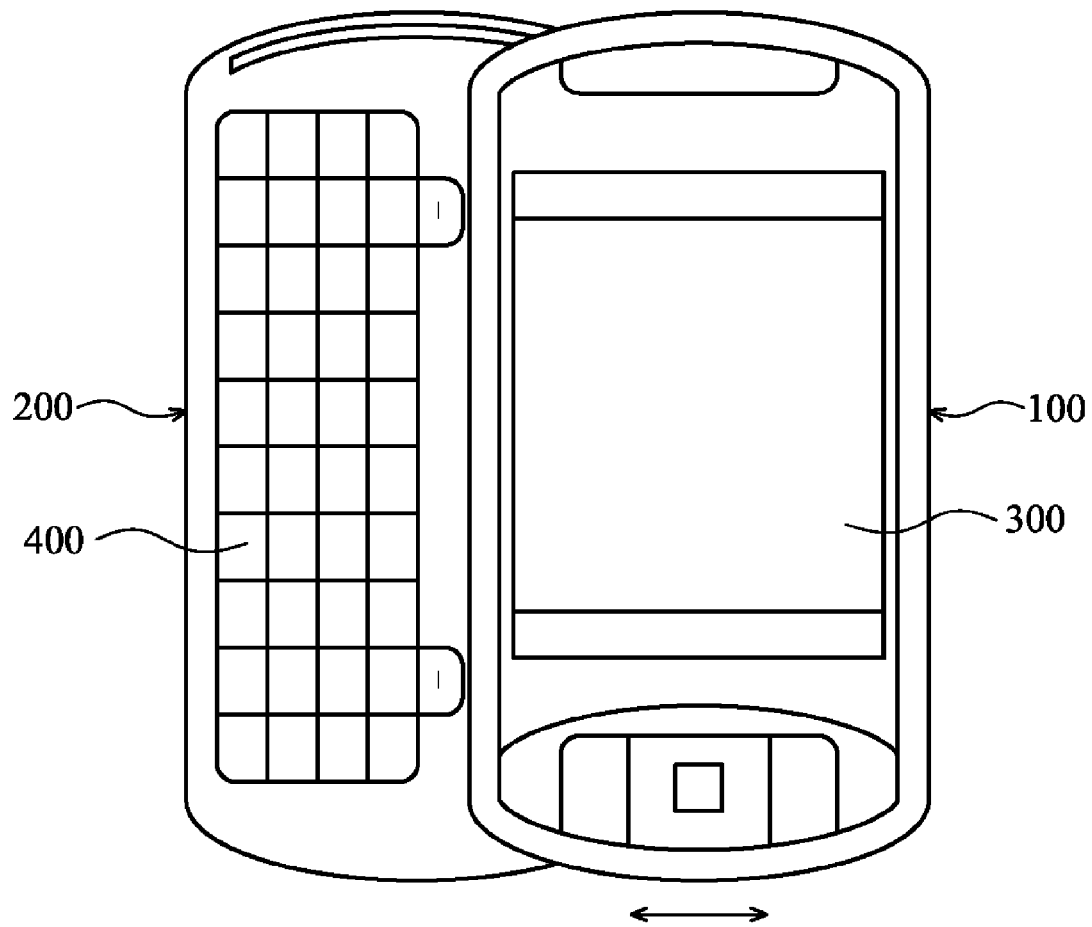
FIG. 1 is a perspective diagram of a conventional sliding-type electronic device.
Figure 2A:
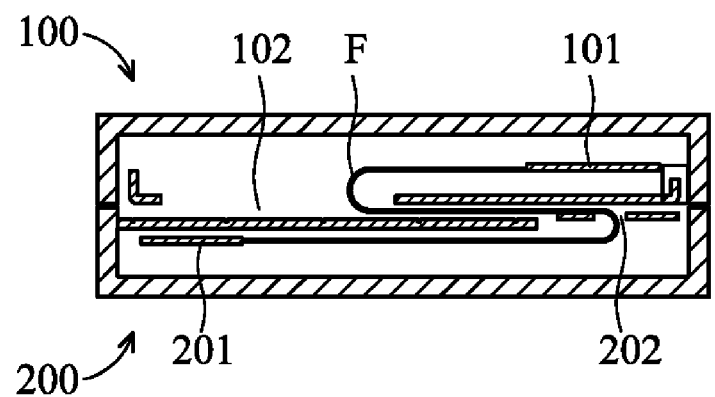
FIGS. 2A and 2B are sectional views of a conventional sliding-type electronic device.
Figure 2B:
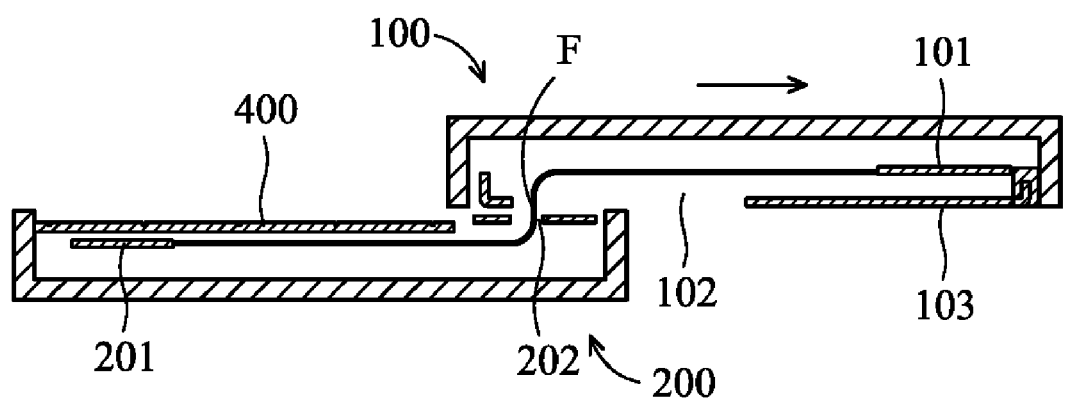
Figure 3:
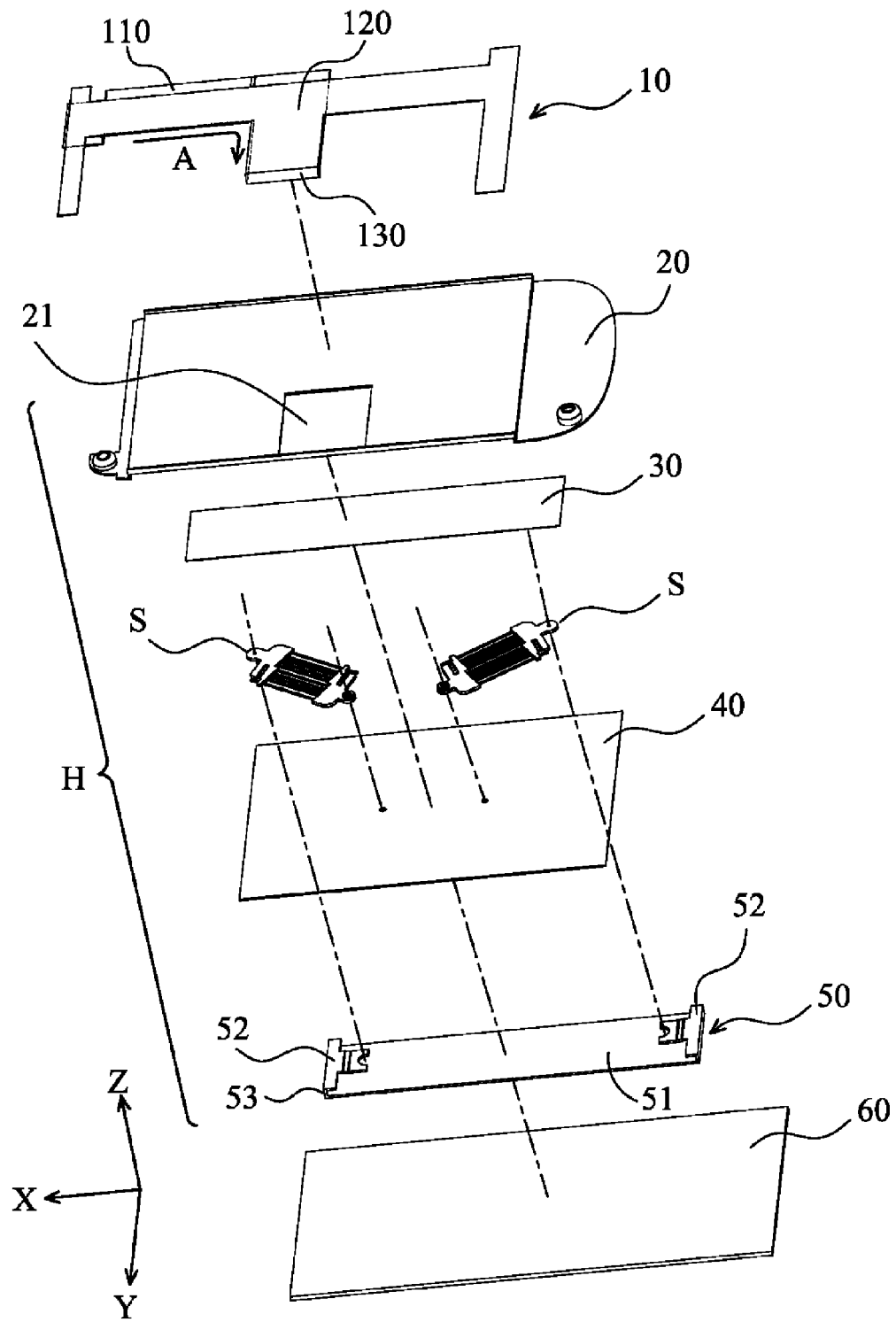
FIG. 3 is an exploded diagram of a connecting mechanism according to an embodiment of the invention.

Referring to FIG. 3, an embodiment of a connecting mechanism is provided to connect a display module to an input module of an electronic device, such as the display module 100 and the input module 200 shown in FIG. 1. The connecting mechanism in FIG. 3 includes an FPC 10, a sliding hinge H, and a circuit board 60. The sliding hinge H includes a slider 20, a cover 30, a sliding plate 40, a fixed member 50, and at least a resilient member S, wherein the slider 20 is fixed to the display module, and the circuited board 60 is disposed in the input module. In this embodiment, the display module and the input module are movably connected via the sliding hinge H, so that the display module is movable relative to the input module along the −Y direction (first direction).

Figure 4:
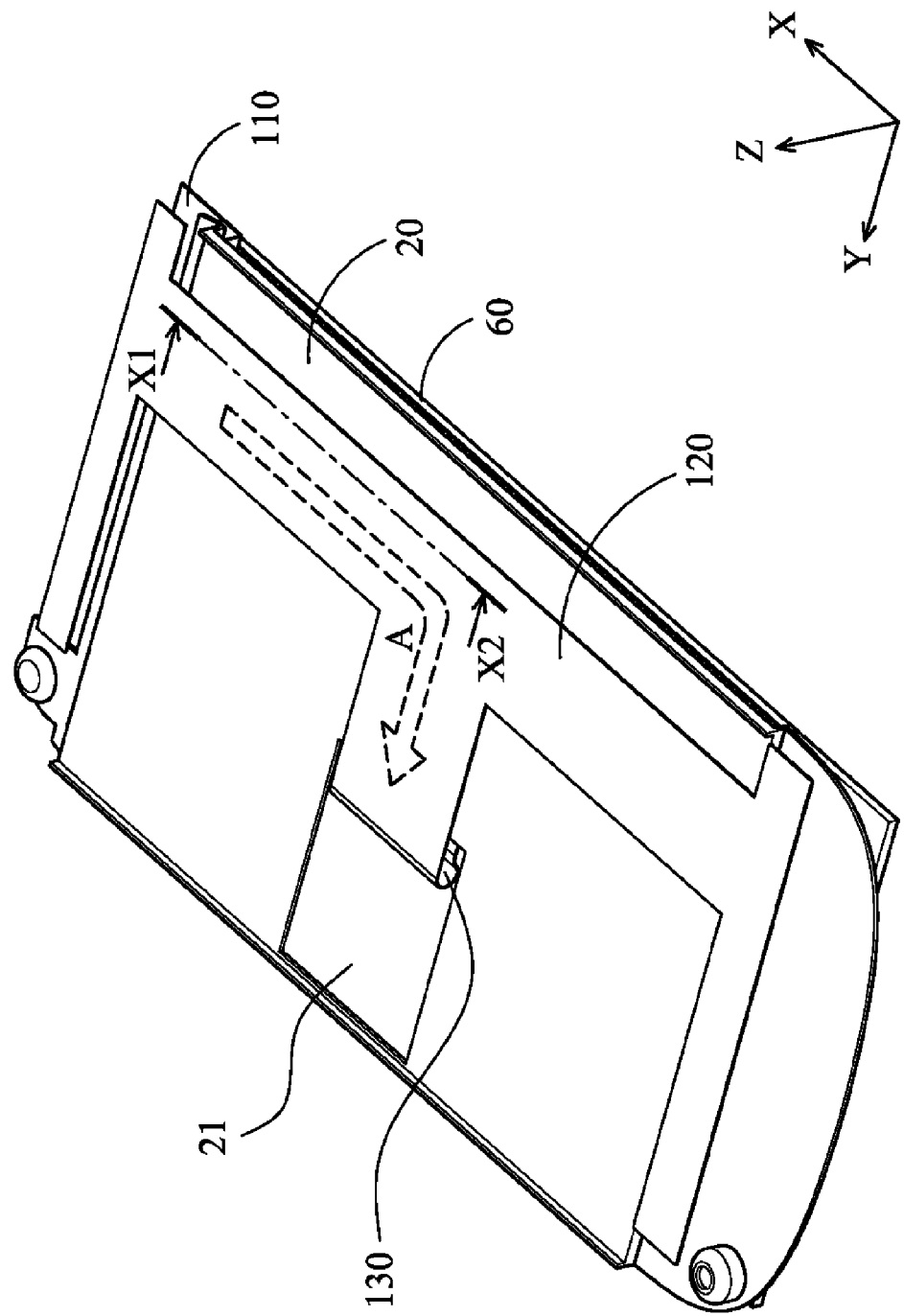
FIG. 4 is a perspective diagram of a connecting mechanism according to an embodiment of the invention.
Figure 5:
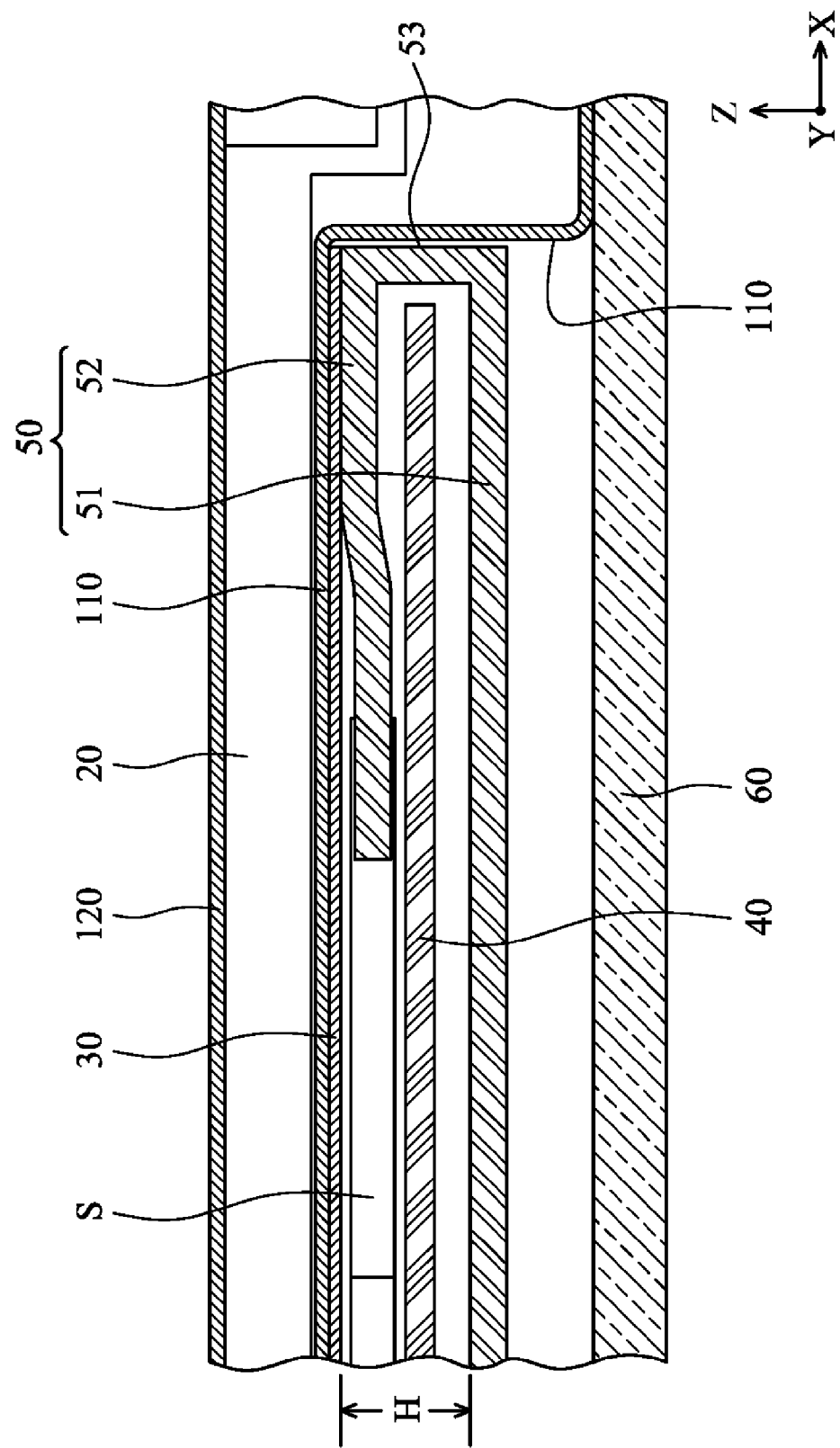
FIG. 5 is a sectional view along X1-X2 in FIG. 4.

FIG. 4 is a perspective diagram of a connecting mechanism, and FIG. 5 is a sectional view along X1-X2 in FIG. 4. The fixed member 50 of the sliding hinge H and the circuited board 60 in FIGS. 3-5 are mounted on the input module, wherein the fixed member 50 includes a main body 51 and two connection portions 52. The connection portions 52 are formed at opposite sides of the main body 51 and project from the main body 51 along the Z direction. As shown in FIG. 5, the connection portion 52 has an L-shaped cross-section, and the cover 30 is fixed to the top side of the connection portion 52. Specifically, a concave space is formed in the middle of the main body 51 with a height H for accommodating the resilient member S and the sliding plate 40.

Referring to FIGS. 3-5, the slider 20 is fixed to the sliding plate 40, and the sliding plate 40 is movably received in the concave space of the fixed member 50, as shown in FIG. 5. Hence, when the display module slides relative to the input module, the slider 20 and the sliding plate 40 are moved relative to the cover 30 and the fixed member 50. As depicted in FIG. 3, both ends of the resilient member S (such as coil spring) are respectively connected to the sliding plate 40 and the connection portion 52 of the fixed member 50, thus providing spring force to the sliding hinge H to facilitate semi-auto sliding.

In this embodiment, the FPC 10 is provided for electrical connection between the display module and the input module. The FPC 10 includes a first portion 110, a second portion 120, and a bent portion 130 connecting the first and second portions 110 and 120. As shown in FIG. 5, the first portion 110 is disposed below the slider 20 and is electrically connected to the circuited board 60. The first portion 110 is adhered to a side wall 53 of the fixed member 50 along the Z direction. Furthermore, the first portion 110 is extended from the side wall 53 of the fixed member 50 to the middle of the slider 20 along the −X direction (second direction), wherein the side wall 53 is perpendicular to the −X direction. As the arrow indicates in FIG. 4, the first portion 110 is then bent and extended from the middle of the slider 20 to an opening 21 thereof along the Y direction (first direction).

Referring to FIGS. 3 and 4, the first portion 110 has an L-shaped structure extended along the arrow A. The bent portion 130 is disposed through the opening 21 to connect the first portion 110 to the second portion 120, wherein the second portion 120 is fixed to the upper side of the slider 20, opposite to the first portion 110 of the FPC 10.

Figure 6:
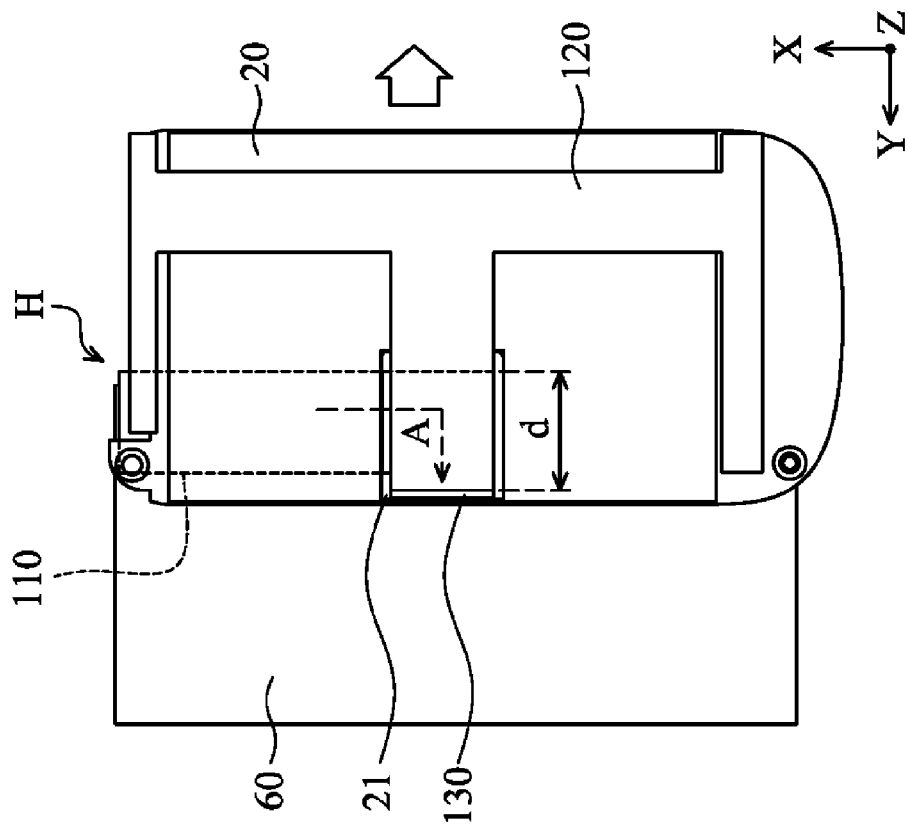
FIG. 6 is a perspective diagram of a connecting mechanism when in a closed state according to an embodiment of the invention.
Figure 7:
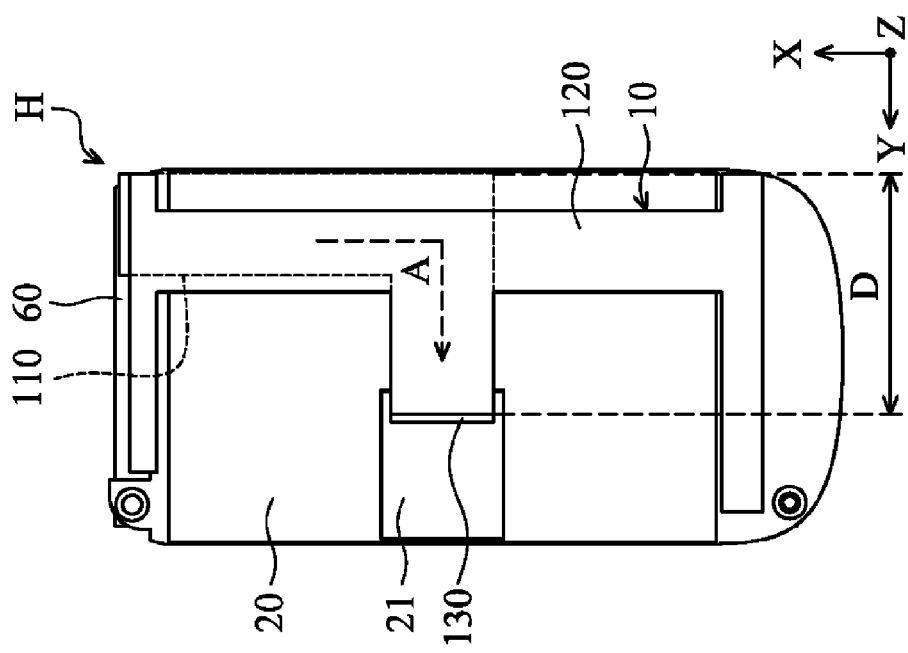
FIG. 7 is a perspective diagram of a connecting mechanism when in an opened state according to an embodiment of the invention.

As shown in FIGS. 6 and 7, the first portion 110 of the FPC 10 is on a lower side of the slider 20 and forms an L-shaped structure extended along the arrow A. The bent portion 130 passes through the opening 21 to connect the L-shaped structure with the second portion 120 on the upper side of the slider 20. When the slider 20 slides relative to the fixed member 50 along the −Y direction (first direction), a part of the L-shaped structure parallel to the Y axis is shifted to the upper side of the slider 20, such that the length thereof decreases from D (FIG. 6) to d (FIG. 7). On the other hand, concurrently, the length of a part of the second portion 120 parallel to the Y axis increases. In FIGS. 6 and 7, the projections of the L-shaped structure and the second portion 120 onto the slider 20 partially overlap.

The application provides a connecting mechanism to connect a display module to an input module of an electronic device. The connecting mechanism includes a FPC having a first portion which forms an L-shaped structure extended from a side wall of a fixed member to the middle of a slider. Furthermore, the L-shaped structure is bent and extended from the middle of the slider to an opening thereof, thus preventing damage and failure of the FPC during operation of the sliding hinge. Additionally, outside exposure of the FPC can be prevented to extend life of usage.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A connecting mechanism for connecting an input module of an electronic device to a display module of the electronic device, wherein the display module is slidable relative to the input module along a first direction, comprising:
    a sliding hinge, movably connecting the input module to the display module, comprising:
    a fixed member, fixed to the input module, wherein the fixed member forms a concave space;
    a slider, fixed to the display module, wherein the slider has an opening;
    a sliding plate, fixed to the slider and movably received in the concave space of the fixed member; and
    a FPC, electrically connecting the input module with the display module and comprising a first portion, a second portion, and a bent portion, wherein the first portion is extended from a side wall of the fixed member to the middle of the slider along a second direction, and the first portion is bent and extended along the first direction to the opening of the slider, wherein the bent portion is extended through the opening to connect the first and second portions which are disposed on opposite sides of the slider,
    wherein the first portion has an L-shaped structure extended from the side wall to the middle of the slider along the second direction, and the first portion is bent and extended along the first direction to the opening of the slider, wherein the second direction is perpendicular to the first direction.

2. The connecting mechanism as claimed in claim 1, wherein the connecting mechanism further comprises a circuit board disposed in the input module and electrically connected to the FPC.

3. The connecting mechanism as claimed in claim 1, wherein the first portion is adhered to the side wall of the fixed member, and the side wall is perpendicular to the second direction.

4. The connecting mechanism as claimed in claim 1, wherein the L-shaped structure is connected to the bent portion.

5. The connecting mechanism as claimed in claim 1, wherein the projections of the L-shaped structure and the second portion onto the slider partially overlap.

6. The connecting mechanism as claimed in claim 1, wherein the connecting mechanism further comprises a resilient member connecting the fixed member with the sliding plate.

7. The connecting mechanism as claimed in claim 6, wherein the resilient member is disposed in the concave space.

8. The connecting mechanism as claimed in claim 6, wherein the fixed member comprises a main body and a connection portion having an L-shaped cross section and projecting from the main body, and the connection portion is connected to an end of the resilient member.

9. The connecting mechanism as claimed in claim 8, wherein the sliding hinge further comprises a cover fixed to the connection portion, and the resilient member is disposed between cover and the sliding plate.

10. An electronic device, comprising:
    an input module;
    a display module, slidable relative to the input module along a first direction;
    a connecting mechanism, connecting an input module to a display module of an electronic device, comprising:
    a sliding hinge, movably connecting the input module to the display module, comprising:
    a fixed member, fixed to the input module, wherein the fixed member forms a concave space;
    a slider, fixed to the display module, wherein the slider has an opening; and
    a sliding plate, fixed to the slider and movably received in the concave space of the fixed member; and
    a FPC, electrically connecting the input module with the display module and comprising a first portion, a second portion, and a bent portion, wherein the first portion is extended from a side wall of the fixed member to the middle of the slider along a second direction, and the first portion is bent and extended along the first direction to the opening of the slider, wherein the bent portion is extended through the opening to connect the first and second portions which are disposed on opposite sides of the slider,
    wherein the first portion has an L-shaped structure extended from the side wall to the middle of the slider along the second direction, and the first portion is bent and extended along the first direction to the opening of the slider, wherein the second direction is perpendicular to the first direction.

11. The electronic device as claimed in claim 10, wherein the connecting mechanism further comprises a circuit board disposed in the input module and electrically connected to the FPC.

12. The electronic device as claimed in claim 10, wherein the first portion is adhered to the side wall of the fixed member, and the side wall is perpendicular to the second direction.

13. The electronic device as claimed in claim 10, wherein the L-shaped structure is connected to the bent portion.

14. The electronic device as claimed in claim 10, wherein the projections of the L-shaped structure and the second portion onto the slider partially overlap.

15. The electronic device as claimed in claim 10, wherein the connecting mechanism further comprises a resilient member connecting the fixed member with the sliding plate.

16. The electronic device as claimed in claim 15, wherein the resilient member is disposed in the concave space.

17. The electronic device as claimed in claim 15, wherein the fixed member comprises a main body and a connection portion having an L-shaped cross section and projecting from the main body, and the connection portion is connected to an end of the resilient member.

18. The electronic device as claimed in claim 17, wherein the sliding hinge further comprises a cover fixed to the connection portion, and the resilient member is disposed between cover and the sliding plate.

* * * * *